UNITED STATES PATENT OFFICE.

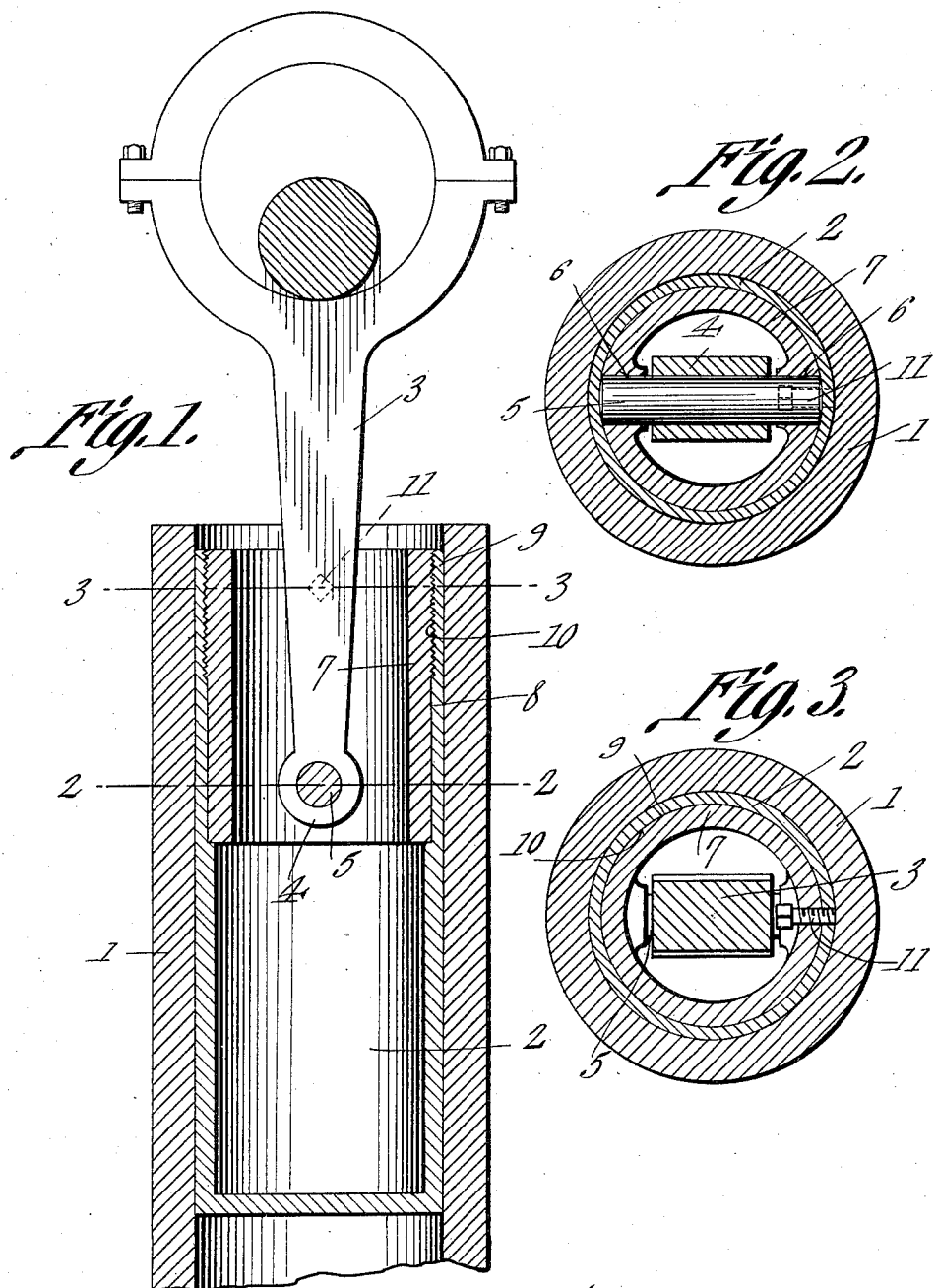

LUCIAN WALTON CUSHMAN, OF ST. JOSEPH, MISSOURI.

PUMP-PISTON.

1,030,977.  Specification of Letters Patent.  Patented July 2, 1912.

Application filed December 19, 1911. Serial No. 666,829.

*To all whom it may concern:*

Be it known that I, LUCIAN W. CUSHMAN, a citizen of the United States, residing at St. Joseph, in the county of Buchanan and State of Missouri, have invented a new and useful Pump-Piston, of which the following is a specification.

This invention relates to improvements in pump pistons, and the primary object of the invention is the provision of a novel form of connecting means between the piston rod and piston, whereby the necessity of boring a transverse pin receiving hole through the body of the piston head is avoided and an auxiliary means in the form of a threaded and slidably fitting sleeve or collar is disposed within the open end of the piston head and carrying the pin connection with the piston rod, thus permitting the contact surface of the piston head with the cylinder to be intact and where used in connection with an explosive engine be provided only with the usual packing ring.

A further object of this invention is the provision of a sleeve adapted to be fitted into the open end of a piston head and carry a piston rod connecting pin disposed therein and limited in its outward movement by the walls of the piston head, said piston pin carrying ring or sleeve being further provided with threaded portions to engage the open end of the piston head and with a set screw to lock the same in the proper adjusted and tightened position.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a longitudinal sectional view through a pump casing and piston head with a device in operative relation to a crank shaft and piston rod. Fig. 2 is a cross section taken on line 2—2 of Fig. 1. Fig. 3 is a cross section taken on line 3—3 of Fig. 1.

Referring to the drawings, the numeral 1 designates the pump casing, or where the device is used in connection with an explosive or steam engine, the cylinder thereof, in which is mounted for reciprocation the hollow piston head 2, which is operably connected for such reciprocating movement to the piston rod 3.

The piston rod 3 is provided with the usual pin connecting sleeve 4, through which is adapted to pass the connecting pin 5, said connecting pin 5 having its ends disposed within the alined bores provided in the projections 6 of the attaching collar or sleeve 7, which as shown is provided with the smooth portion 8 and the threaded portion 9 which is adapted to fit in the counter bore and the open end of the piston head and have its threaded portion 9 engage the threads 10 provided internally at the mouth of the piston head. By this means it will be seen that the pin 5 may be connected in place within the sleeve or collar 7 before the insertion thereof within the piston head, and that the said sleeve may be inserted within the piston head being rotated therein so that the threads 9 and 10 will co-act and cause the said sleeve to be seated within the counter bore as illustrated in Fig. 1, where the same may be retained in the proper relative position to the piston head by means of the set screw 11 which is disposed within the sleeve and in such a position as to be readily accessible when it is desired to remove the sleeve 7 from the counter bore of the piston head.

The set screw 11 is so disposed as to be out of line of the swinging movement of the crank and would therefore be directly above the axial line of the pin 5 and one of the projections 6 of the sleeve.

From the foregoing description taken in connection with the drawings, it is evident that the provision of a separate sleeve as 7, providing a receptacle for the connecting pin 5 of the piston rod to the piston head, that the said pin when the sleeve is inserted within the piston head will be prevented from sidewise movement in the walls of the piston head and at the same time the surface of the piston head will not be broken by the usual insertion of the connecting pin and where used in steam and explosive engines, the usual packing rings will be the only obstructions upon the surface of the piston head, or where necessary in a pump, thus providing a means which renders the connection of the piston rod to the piston head easy and at the same time provides a brace at the open end portion of the piston head, the said sleeve being of sufficient length to brace the same the full length thereof and at the open end of the piston as clearly illustrated in Fig. 1.

What is claimed is—

A cylindrical piston having its open end counter bored to provide an internal annular shoulder and with the portion adjacent to the rim interiorly screw threaded, a sleeve open at both ends fitted within the counter bored portion with its inner end seated against the annular shoulder thereof, said sleeve having external screw threads to coact with the threads of the counter bore to hold the sleeve against longitudinal movement relative to the piston, said sleeve having oppositely disposed apertures near its inner end for the reception of the piston rod connecting pin, and a set screw disposed in the wall of the sleeve to engage the adjacent portion of the piston to lock the sleeve against turning in the piston.

In testimony that I claim the foregoing as my own, I have hereto affixed my signature in the presence of two witnesses.

LUCIAN WALTON CUSHMAN.

Witnesses:
 W. S. M. LUCAS,
 MAX ANDRIANO.

Copies of this patent may be obtained for five cents each, by addressing the "Commissioner of Patents, Washington, D. C."